United States Patent [19]

Dolin

[11] Patent Number: 5,524,349
[45] Date of Patent: Jun. 11, 1996

[54] LAWN TRIMMER SHIELD

[76] Inventor: Earl S. Dolin, P.O. Box 162, Ottawa, W. Va. 25149

[21] Appl. No.: 379,773

[22] Filed: Jan. 27, 1995

[51] Int. Cl.⁶ .............................. B26B 27/00; B26B 29/02
[52] U.S. Cl. ............................. 30/276; 30/286; 30/DIG. 5
[58] Field of Search ............................. 30/276, 347, 286, 30/DIG. 5; 56/12.7, 12.6, 12.8, 10.1, 10.4

[56] References Cited

U.S. PATENT DOCUMENTS

| | | | |
|---|---|---|---|
| 2,263,431 | 11/1941 | White | 30/276 |
| 2,691,377 | 10/1954 | Hood | 30/276 |
| 2,911,781 | 11/1959 | Baehr | 30/276 |
| 4,475,287 | 10/1984 | Beihoffer . | |
| 4,630,371 | 12/1986 | Graham . | |
| 4,651,422 | 3/1987 | Everts . | |
| 4,744,148 | 5/1988 | Brown | 30/347 |
| 4,825,548 | 5/1989 | Driggers | 30/DIG. 5 |
| 4,845,889 | 7/1989 | Taylor . | |
| 5,010,720 | 4/1991 | Corsi . | |
| 5,048,187 | 9/1991 | Ryan . | |
| 5,077,898 | 1/1992 | Hartwig . | |

FOREIGN PATENT DOCUMENTS 3521685  2/1986  Germany .
2125668  3/1984  United Kingdom .

Primary Examiner—Rinaldi I. Rada
Assistant Examiner—Charles Goodman
Attorney, Agent, or Firm—Richard C. Litman

[57] ABSTRACT

A protective shield for a grass and weed trimmer which prohibits grass and weed clippings and other debris from reaching the operator. The shield is characterized by a clamping member for securing the shield to the trimmer, a supporting member attached to the clamping member, and a protective skirt for shielding the operator. The clamping member includes a two C-shaped members, coupled together at one end by a hinge, which fit around the shaft of the lawn trimmer. The support member includes a first and a second rod which extend perpendicularly from the clamping member such that the longitudinal axes of the rods are aligned when the clamping member is closed around the shaft of the trimmer. The protective skirt is generally rectangular in shape and includes a top side having two rectangular extensions on either side of a U-shaped cutout. A tubular sleeve is provided at the top end of each of the rectangular extensions to receive a respective one of the rods.

6 Claims, 2 Drawing Sheets

LAWN TRIMMER SHIELD

BACKGROUND OF THE INVENTION

1. Field of the Invention

The present invention relates to grass and weed trimmers.

2. Description of the Prior Art

In recent years powered, hand-held, weed and grass trimmers, utilizing a rotating filament to accomplish the trimming, have come into wide spread use. Such trimmers are generally characterized by an elongated body in the form of a tubular shaft having forward and rearward ends. A spool of the cutting filament is mounted at the forward end of the trimmer and a length or segment of the filament is unwound from the spool so as to perform the cutting action as the spool is rotated at high speed. In some trimmer models the forward end of the trimmer is provided with a shield facing the operator to protect the operator from the rotating filaments as well as sticks, gravel, stones and other debris which might otherwise be thrown toward the operator by the rotating filament. However, in most trimmers, the shield does not extend in a full circle, and thus, is exposed as it does its work. Thus, grass and weed clippings and other debris may reach the operator from the unshielded portions of the trimmer. No shield is seen in the prior art which effectively prohibits all clippings and debris from reaching the operator.

Lawn trimmer shields for partially protecting the operator from clippings and other debris and for protecting trees, plants, and the like from damage from being struck by the rotating filament of the trimmer are well known. Examples of such shields may be seen in the following references: U.S. Pat. No. 5,077,898, issued to James J. Hartwig on Jan. 7, 1992; U.S. Pat. No. 5,010,720, issued to Louis V. Corsi on Apr. 30, 1991; U.S. Pat. No. 5,048,187, issued to Patrick J. Ryan on Sep. 17, 1991; U.S. Pat. No. 4,845,889, issued Jess W. Taylor on Jul. 11, 1989; U.S. Pat. No. 4,630,371, issued to Andrew J. Graham on Dec. 23, 1986; U.S. Pat. No. 4,651,422, issued to Robert G. Everts on Mar. 24, 1987; U.S. Pat. No. 4,475,287, issued to Randall A. Beihoffer on Oct. 9, 1984; British Patent Application No. 2,125,668, filed by Robert G. Everts and published on Mar. 14, 1984; and West German Patent Application No. 3,521,685, filed by Goran A. Nilsson and published on Jun. 18, 1985. The above mentioned references do not teach or suggest a shield for a lawn trimmer including a rectangular protective skirt to prevent clippings and debris from reaching the operator.

None of the above inventions and patents, taken either singly or in combination, is seen to describe the instant invention as claimed.

SUMMARY OF THE INVENTION

The present invention is directed to a protective shield for a grass and weed trimmer which prohibits grass and weed clippings and other debris from reaching the operator. The shield is characterized by a clamping member for securing the shield to the trimmer, a supporting member attached to the clamping member, and a protective skirt for shielding the operator.

The clamping member includes a first C-shaped member having a first and second end and a second C-shaped member having a third and fourth end. The first end and the third end are coupled together by a hinge. The second end and the fourth end are removably fastened to one another such that the first and second C-shaped members fit around the tubular shaft of the trimmer.

The supporting member includes a first and a second rod. The first rod is attached to the first C-shaped member and the second rod is attached to the second C-shaped member such that when the first and second C-shaped members are fitted around the tubular shaft of the trimmer, the longitudinal axes of first and second rods are aligned.

The protective skirt is generally rectangular in shape and includes a top side having two rectangular extensions on either side of a U-shaped cutout. A tubular sleeve is provided at the top end of each of the rectangular extensions to receive a respective one of the rods.

Accordingly, it is a principal object of the invention to provide a protective shield for a grass and weed trimmer which prohibits grass and weed clippings and other debris from reaching the operator.

It is another object of the invention to provide a protective shield for a grass and weed trimmer which is adaptable to fit most grass and weed trimmers.

It is a further object of the invention to provide a protective shield for a grass and weed trimmer which is easily attached and removed from the grass and weed trimmer.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
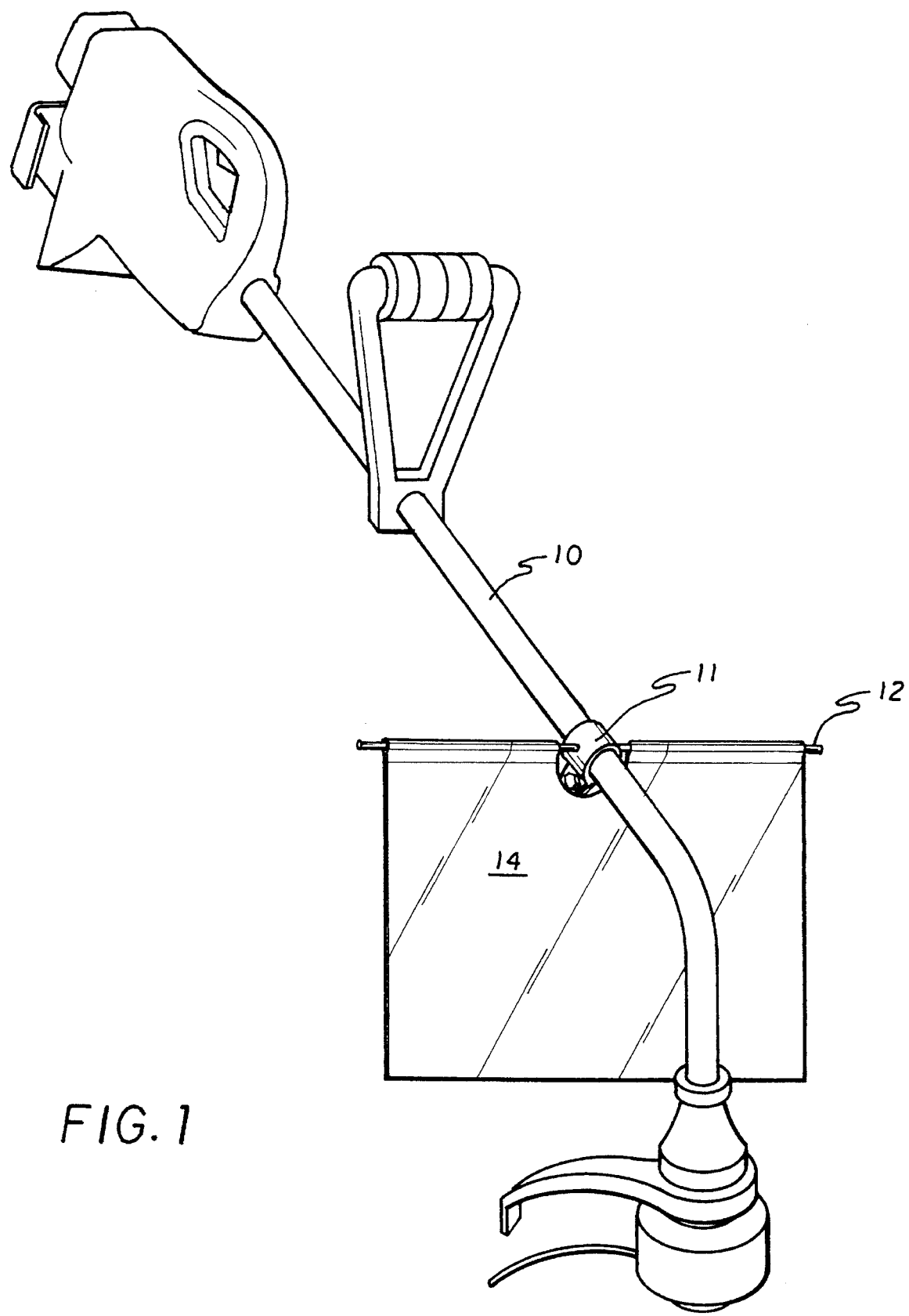
FIG. 1 is environmental perspective of the invention showing the invention attached to a weed and grass trimmer.

A protective shield for a grass and weed trimmer which prohibits grass and weed clippings and other debris from reaching the operator is shown in FIG. 1. Conventional parts of the grass and weed trimmer include tubular shaft 10. The main components of the shield include a clamping member 11 for securing the shield to the trimmer, a supporting member 12, and a protective skirt 14 for shielding the operator.

Figure 2:
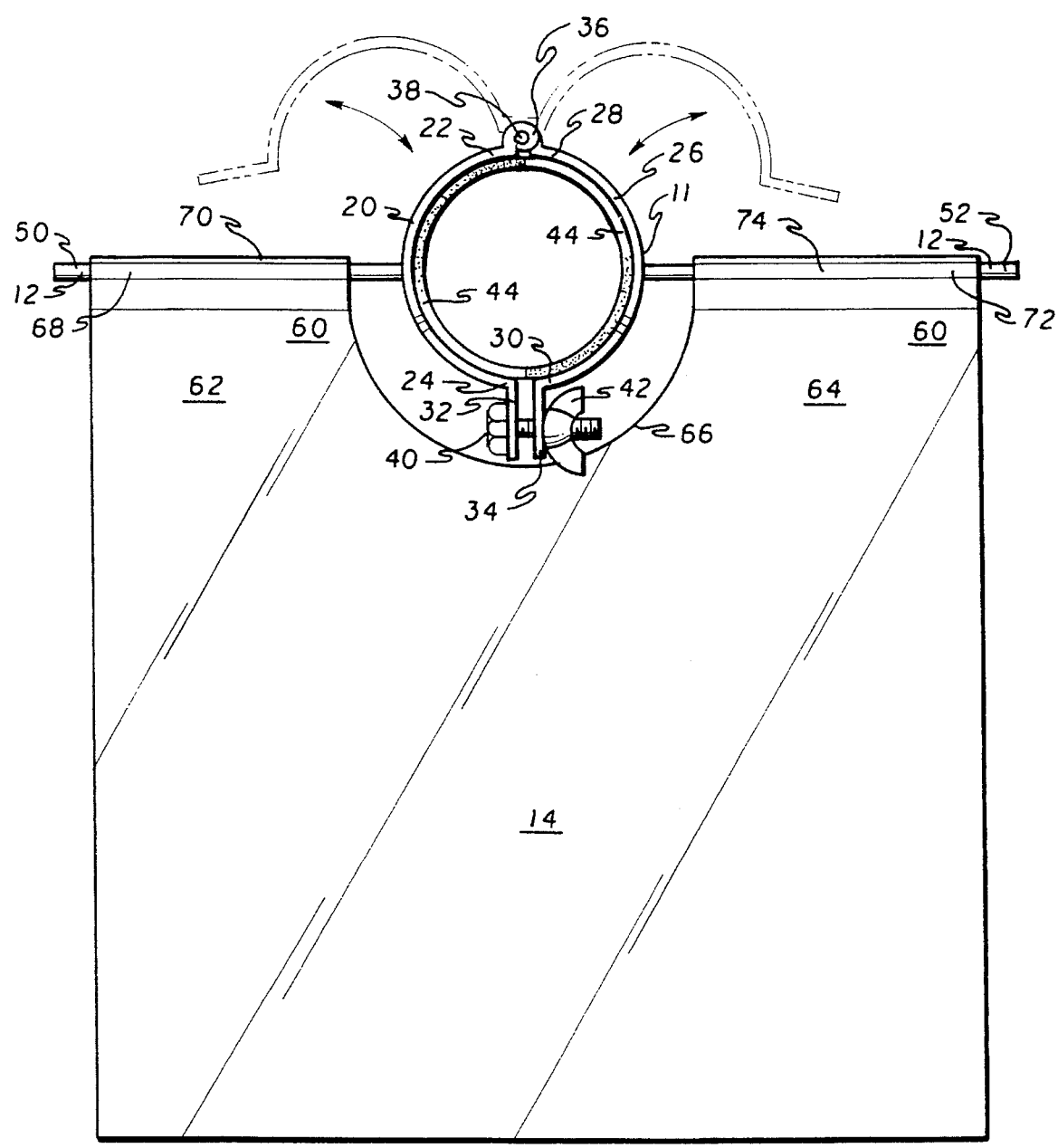
FIG. 2 is a side elevational view of the invention showing the clamping member in both the open and closed position.

Referring to FIG. 2, clamping member 11 includes a first C-shaped member 20, having a first end 22 and second end 24, and a second C-shaped member 26, having a third end 28 and fourth end 30. A first plate 32 extends perpendicularly from second end 24. A second plate 34 extends perpendicularly from fourth end 30. First end 22 and third end 28 are coupled together by hinge 36. First and second C-shaped members 20 and 26 pivot about a hinge pin 38, between an open and a closed position. The open position allows first and second C-shaped members 20 and 26 to be removed from tubular shaft 10. In the closed position, clamping member 11 is fitted around tubular shaft 10 and first plate 32 and second plate 34 are fastened together by a bolt 40 and a wing nut 42. Alternatively, any other well known fastening means may be used to join first and second plates 32 and 34.

A bushing 44 having two symmetrical C-shaped portions is positioned between first and second C-shaped members 20 and 26 and tubular shaft 10. Bushing 44 is used to limit abrasions upon the surface of tubular shaft 10 and to permit clamping member 11 to accommodate shafts of different sizes.

Supporting member 12 includes a first cylindrical rod 50 and a second cylindrical rod 52. First cylindrical rod 50 extends perpendicularly from first C-shaped member 20. Second cylindrical rod 52 extends perpendicularly from second C-shaped member 26 such that the longitudinal axes of first and second cylindrical rods 50 and 52 are in alignment. Alternatively, first and second cylindrical rods 50 and 52 may be removably attached to clamping member 11 by any well known fastening means, such as, by providing threads on first and second cylindrical rods 50 and 52 which matingly engaging threaded holes in clamping means 11.

Protective skirt 14 is generally rectangular in shape and includes a top side 60 having two rectangular extensions, 62 and 64, on either side of a U-shaped cutout 66. A first tubular sleeve 68 is provided at the top end 70 of the first rectangular extension 62. First tubular sleeve 68 is formed by folding over top end 70 to meet first rectangular extension 62, thus forming a hollow sleeve 68 to receive first cylindrical rod 50. A second tubular sleeve 72 is provided at the top end 74 of second rectangular extension 64. Second tubular sleeve 72 is formed by folding over top end 74 to meet second rectangular extension 64, thus forming a hollow sleeve 72 to receive second cylindrical rod 52.

In operation, protective skirt 14 is mounted on supporting member 12 such that first and second cylindrical rods 50 and 52 pass through first and second tubular sleeves 68 and 72, respectively. Clamping member 11 is positioned on tubular shaft 10 and moved into the closed position such that bushing 44 engages the surface of tubular shaft 10. Plates 32 and 34 are fastened by inserting bolt 40 and tightening nut 42. Clamping member 11 may accommodate shafts of different sizes by moving the position of nut 42 along bolt 40 or by changing the thickness of bushing 44. Protective skirt 14 extends vertically downward from tubular shaft 10 to protect the operator from grass and weed clippings and debris.

It is to be understood that the present invention is not limited to the sole embodiment described above, but encompasses any and all embodiments within the scope of the following claims.

I claim:

1. A protective shield for a grass and weed trimmer, the trimmer including an elongated shaft with a cutter head at one end and a handle at the other end, said shield comprising:

a clamping member for securing the shield to the trimmer shaft, said clamping member including a first C-shaped member having a first and second end and a second C-shaped member having a third and fourth end, said first end and said third end being coupled together by a hinge, said second and said fourth end being removably connected such that said first and second C-shaped members fit around the shaft of the trimmer;

a bushing positioned between said first and second C-shaped members and the shaft of the trimmer;

a supporting member attached to said clamping member, said supporting member including a first rod having a longitudinal axis and a second rod having a longitudinal axis, said first rod extending perpendicularly from said first C-shaped member, said second rod extending perpendicularly from said second C-shaped member such that when said first and second C-shaped members are fitted around the shaft of the trimmer, said longitudinal axis of said first rod is in alignment with said longitudinal axis of said second rod, each of said rods engaging said protective skirt and thereby supporting said protective skirt; and a generally flat, vertically disposed protective skirt supported and suspended by said supporting member, for shielding an operator from grass and weed clippings and other debris.

2. The protective shield according to claim 1, wherein said first and said second rods are oppositely attached to said clamping member.

3. The protective shield according to claim 1, wherein said supporting skirt is generally rectangular in shape, said skirt having a top side having two rectangular extensions on either side of a U-shaped cutout, said rectangular extensions having a top end, a tubular sleeve being provided at the top end of each of said rectangular extensions to receive said support member.

4. The protective shield according to claim 1, wherein said supporting skirt is generally rectangular in shape, said skirt having a top side having two rectangular extensions on either side of a U-shaped cutout, said rectangular extensions having a top end, a tubular sleeve being provided at the top end of each of said rectangular extensions to receive a respective one of said rods.

5. A protective shield for a grass and weed trimmer, the trimmer including an elongated shaft with a cutter head at one end and a handle at the other end, said shield comprising:

a clamping member for securing the shield to the trimmer shaft, said clamping member including a first C-shaped member having a first and second end and a second C-shaped member having a third and fourth end, said first end and said third end being coupled together by a hinge, said second and said fourth end being removably connected such that said first and second C-shaped members fit around the shaft of the trimmer;

a supporting member attached to said clamping member, said supporting member including a first rod having a longitudinal axis and a second rod having a longitudinal axis, said first rod extending perpendicularly from said first C-shaped member, said second rod extending perpendicularly from said second C-shaped member such that when said first and second C-shaped members are fitted around the shaft of the trimmer, said longitudinal axis of said first rod is in alignment with said longitudinal axis of said second rod, each of said rods engaging said protective skirt and thereby supporting said protective skirt; and a generally flat, vertically disposed protective skirt supported and suspended by said supporting member, for shielding an operator from grass and weed clippings and other debris.

6. The protective shield according to claim 5, wherein said supporting skirt is generally rectangular in shape, said skirt having a top side having two rectangular extensions on either side of a U-shaped cutout, said rectangular extensions having a top end, a tubular sleeve being provided at the top end of each of said rectangular extensions to receive one of said rods.

* * * * *